United States Patent [19]
Copeland

[11] 4,058,793
[45] Nov. 15, 1977

[54] VEHICLE HEADLIGHT WARNING CIRCUIT

[76] Inventor: William G. Copeland, 8429 Lee Blvd., Leawood, Kans. 66206

[21] Appl. No.: 689,209

[22] Filed: May 24, 1976

[51] Int. Cl.² .................. B60Q 11/00; G08B 21/00
[52] U.S. Cl. ............................... 340/52 D; 315/82
[58] Field of Search ............... 340/52 D; 315/77, 80, 315/82, 84

[56] References Cited
U.S. PATENT DOCUMENTS

| | | | |
|---|---|---|---|
| 2,756,408 | 7/1956 | McKaig | 340/52 D |
| 2,780,797 | 2/1957 | Gooding | 340/52 D |
| 2,942,235 | 6/1960 | Warhurst | 340/52 D |
| 3,124,782 | 3/1964 | Norton | 340/52 D |
| 3,283,299 | 11/1966 | Savino | 340/52 D |
| 3,323,122 | 5/1967 | Larkins | 340/52 D |
| 3,391,302 | 7/1968 | Weingarden | 340/52 D |
| 3,628,085 | 12/1971 | Brock | 315/82 |
| 3,898,612 | 8/1975 | Lee | 340/52 D |
| 3,905,013 | 9/1975 | Lee | 340/52 D |

*Primary Examiner*—John W. Caldwell, Sr.
*Assistant Examiner*—Joseph E. Nowicki
*Attorney, Agent, or Firm*—Fishburn, Gold & Litman

[57] ABSTRACT

A vehicle headlight warning circuit includes an electronic sounder connected between a vehicle ignition switch and the headlight switch of the vehicle with the sounder emitting an audible tone in response to a voltage imbalance therebetween when the lights are on and the ignition is off. A mute switch is provided in a parallel path and is operative to activate a relay for overriding the warning circuit should it be desired to operate the vehicle lights when the vehicle ignition switch is turned off.

3 Claims, 2 Drawing Figures

VEHICLE HEADLIGHT WARNING CIRCUIT

The present invention relates to automobile warning devices and more particularly to a headlight reminder circuit.

There exists a number of devices for warning a motorist or vehicle operator that the lights have been left on when the ignition is turned off to prevent unnecessary battery drainage. In general such devices are relatively complicated, require the connection of at least three wires for operation, and do not include a means for overriding the device when it is desired to use the vehicle lights without the motor running or the ignition switch being turned on, such as during emergencies and the like.

The device of the present invention is simple in construction, requires only two wires to be connected for operation, and provides a means for overriding the warning circuit when desired.

The principal objects of the present invention are: to provide a headlight warning circuit which is adapted to be connected between a vehicle ignition switch and a respective vehicle headlight switch; to provide such a circuit which is responsive to a voltage imbalance between the vehicle ignition switch and the vehicle headlight switch when the vehicle lights are on and the ignition switch is off; to provide such a circuit employing an audible electronic sounder as a warning device; to provide such a circuit having an override means including a relay for selectively interrupting the warning circuit; to provide such a circuit requiring the connection of only two color coded wires for operation; to provide such a circuit which is adapted for use in vehicles having either a negative or a positive ground electrical system; and to provide such a vehicle headlight warning circuit which is economical to manufacture, easy to install, positive in operation, and which is particularly well adapted for its intended purpose.

Other objects and advantages of this invention will become apparent from the following description taken in connection with the accompanying drawings wherein are set forth by way of illustration and example, certain embodiments of this invention.

The drawings constitute a part of the specification and include an exemplary embodiment of the present invention and illustrate various objects and features of the vehicle headlight warning circuit.

Figure 1:
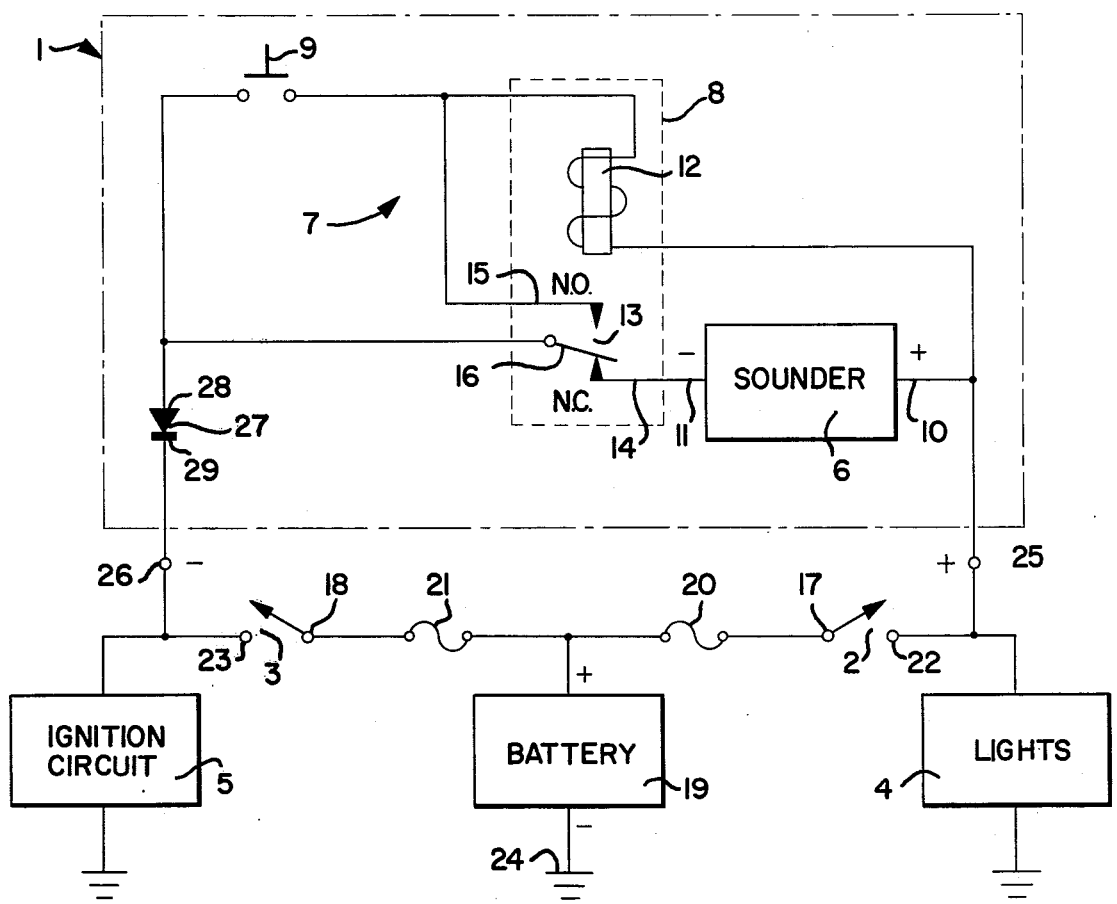
FIG. 1 is a schematic diagram of the vehicle headlight warning circuit connected between a vehicle ignition switch and headlight switch.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring to the drawings in more detail:

The reference numeral 1 generally designates a vehicle headlight warning circuit for connecting between the non-battery terminals of a vehicle headlight switch 2 and the vehicle ignition switch 3 for reminding a motorist to turn off the lights 4 of the vehicle (not shown) after the ignition circuit 5 has been turned off. The warning circuit includes an electric audible signal device or sounder 6 as a warning device and includes an override circuit 7 comprising a relay 8 and a mute switch 9 for disabling the warning circuit 1 when it is desirable to use the vehicle lights 4 without the ignition switch 3 being closed.

The sounder 6 may be any suitable two terminal audible signal device, such as a buzzer. However, in the present invention, the sounder 6 is preferably a solid state audible signal device, such as the Mallory "Sonalert" for high reliability, low current drain, and high sound output. Such a device has a polarity which must be observed, therefore, the sounder 6 has a positive terminal 10 and a negative terminal 11.

The relay 8 is a conventional, electro-mechanical relay having a solenoid coil 12 and a single pole, double throw switch 13 including a normally closed (NC) contact 14, a normally open (NO) contact 15, and a common reed 16 which is movable upon energization of the coil 12.

The headlight switch 2 and the ignition switch 3 have respective battery terminals 17 and 18 connected to a vehicle battery 19 through respective fuses 20 and 21, and have non-battery terminals 22 and 23 connected respectively to the vehicle lights 4 and the ignition circuit 5.

When either the headlight switch 2 or the ignition switch 3 is closed, there is a voltage difference respectively across the vehicle lights 4 or the ignition circuit 5 to the vehicle ground 24. When either switch is open, the respective non-battery terminal is substantially at the potential of the vehicle ground 24. If one of the switches 2 or 3 is closed, there is a voltage difference from the closed switch non-battery terminal to the open switch non-battery terminal.

The present invention takes advantage of the potential difference between the non-battery terminals 22 and 23 by providing a circuit with an element or device that gives an audible warning when the headlight switch 2 is closed and the ignition switch 3 is open. Assuming a negative ground vehicle electrical system, when the headlight switch 2 is closed and the ignition switch 3 is open, the headlight switch non-battery terminal 22 is more positive than the ignition switch non-battery terminal 23. Therefore, the warning circuit 1 has a positive circuit terminal 25 and a negative circuit terminal 26. In order to prevent sounding an alarm when the ignition switch 3 is closed and the headlight switch 2 is open, and to prevent damage to the sounder 6 when that is the case, a rectifier diode 27 is included in the circuit, as will be described later.

In the illustrated warning circuit 1, the positive sounder terminal 10 is connected to the positive circuit terminal 25, and the negative sounder terminal 11 is connected to the relay NC contact 14. The relay reed 16 is connected to the anode 28 of the diode 27, and the cathode 29 of the diode 27 is connected to the negative circuit terminal 26. The relay coil 12 is connected between the sounder positive terminal 10 and the relay NO contact 15. The mute switch 9 is connected between the relay NO contact 15 and the reed 16.

In operation, when both the headlight switch 2 and the ignition switch 3 are either closed or open, no alarm sounds because there is no voltage difference or not a sufficient difference between the respective non-battery terminals 22 and 23. When the ignition switch 3 is closed and the headlight switch 2 is open, there is a voltage difference between the non-battery 23 and 22, with the terminal 23 being the more positive. However, the diode 27 prevents current flow through the warning circuit 1 in the direction from the negative circuit terminal 26 to the positive circuit terminal 25, and no alarm sounds.

When the headlight switch 2 is closed and the ignition switch 3 is open or when both switches are cloed and the ignition switch 3 is then opened, there is a voltage difference between the non-battery terminals 22 and 23 with the terminal 22 being more positive, and the alarm sounds. In conventional current flow terms, current flows from the positive side of the battery 19, through the headlight fuse 20, the headlight switch 2, the positive circuit terminal 25, the sounder 6, the relay NC contact 14 and reed 16, the diode 27 in the forward biased direction, the negative circuit terminal 26, through the ignition circuit 5, such as the ignition coil (not shown), and to the negative side of the battery 19 by way of the vehicle ground 24. The sounder 6 continues to emit a tone until either the headlight switch 2 is opened, the ignition switch 3 is closed, or the mute switch 9 is closed.

When it is desired to operate the vehicle lights 4 without the vehicle engine running or without the ignition switch 3 being closed, the override circuit 7 is employed by holding the mute switch 9 closed, closing the headlight switch 2, after which the mute switch 9 may be released. If the headlight switch 2 is closed first, the sounder 6 will emit a tone until the mute switch 9 is closed.

When the mute switch 9 is closed in the presence of the proper polarity voltage across the circuit terminals 25 and 26, the relay coil 12 is energized, causing the relay reed 16 to change positions thereby breaking the connection between the reed 16 and the relay NC contact 14 and making the connection between the reed 16 and the NO contact 15. As long as the coil 12 remains energized, the reed 16 will remain in contact with the NO contact 15, therefore, the mute switch 9 may be released. With the reed 16 separated from the NC contact 14, the sounder circuit is open, therefore, no alarm may sound. If either the headlight switch 2 is opened or the ignition switch 3 is closed, the circuit terminals 25 and 26 will be returned to substantially equal potential. Therefore, the relay 8 will return to its normal state, re-establishing contact between the reed 16 and the NC contact 14, and the warning circuit 1 will thus be rearmed. Should there be any leakage current from the lights 4 to the ignition circuit 5, such leakage current would not be sufficient either to maintain the reed 16 in contact with the NO contact 15 or to actuate the sounder 6.

Figure 2:
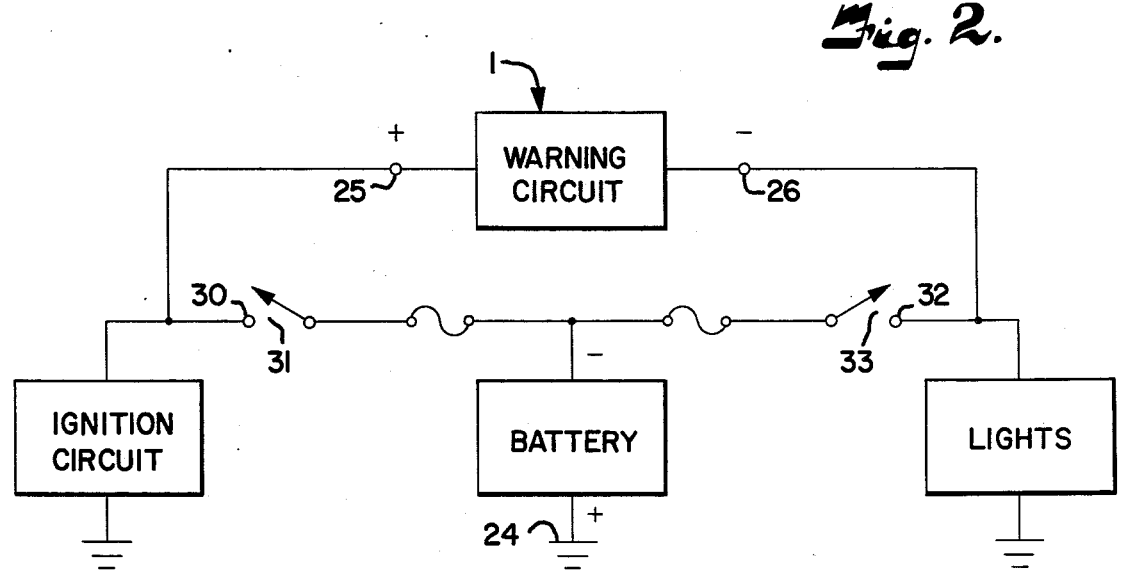
FIG. 2 is a schematic diagram showing the headlight warning circuit connected for use in a vehicle having a positive ground electrical system.

The warning circuit 1 is also designed for use in vehicles having positive ground electrical systems, see FIG. 2. In this case, the positive circuit terminal 25 is connected to the non-battery terminal 30 of the ignition switch 31, and the negative circuit terminal 26 is connected to the non-battery terminal 32 of the headlight switch 33. As in FIG. 1, the diode 27 is connected in the warning circuit 1 in such a manner as to prevent current flow from the negative circuit terminal 26 to the positive circuit terminal 25 when the ignition switch 31 is closed and the headlight switch 33 is open. Operation of the warning circuit 1 in a vehicle with a positive ground electrical system is substantially the same as for a vehicle with a negative ground.

While the warning circuit 1 of the present invention has been described as a headlight warning circuit, it is contemplated that the warning circuit 1 could be used as a reminder to turn off other electrical accessories in a vehicle, such as a radio, tape player, etc., when these accessories are operable without the ignition being turned on.

It is to be understood that while certain forms of the present invention have been described and illustrated, it is not to be limited to the specific forms or arrangements of parts herein described and shown, except insofar as such limitations are included in the following claims.

What I claim and desire to secure by Letters Patent is:

1. A headlight warning circuit for use in a vehicle having a headlight switch, an ignition switch, and a negative ground electrical system, each of said switches having a battery terminal and a non-battery terminal, said non-battery terminals having no direct, non-load intervening path to the vehicle battery, there being a potential difference from said headlight switch non-battery terminal to said ignition switch non-battery terminal when said headlight switch is closed and said ignition switch is open, said potential difference being capable of providing an alarm signal current, said circuit comprising:
   a. a positive circuit terminal and a negative circuit terminal, said positive circuit terminal being connected to a headlight switch non-battery terminal and said negative circuit terminal being connected to an ignition switch non-battery terminal;
   b. a rectifier diode having an anode and a cathode, said cathode being connected to said negative circuit terminal;
   c. an electric sounding means having a positive terminal thereof connected to said positive circuit terminal, said electric sounding means having a negative terminal connectable to said diode anode, said sounding means emitting an audible tone in response to said alarm signal current flow therethrough; and
   d. override means in the circuit and including an interrupter switch connected between the negative terminal of said sounding means and said diode anode for selectively interrupting the flow of said alarm signal current through said sounding means when said headlight switch is closed and said ignition switch is open; said override means including:
      1. a relay having a coil and a single pole double throw relay switch, said coil having opposite terminals and said relay switch having a normally closed terminal, a normally open terminal, and a common terminal;
      2. said relay coil having one terminal connected to said sounding means positive terminal, the other coil terminal being connected to said relay switch normally open terminal;
      3. said relay switch normally closed terminal being connected to said sounding means negative terminal;
      4. said relay switch common terminal being connected to said diode anode, said interrupter switch being said relay switch normally closed terminal and said common terminal; and
      5. a normally open, momentary contact mute switch connected between said relay switch common terminal and said relay switch normally open terminal, whereby closing said mute switch when said sounding means is conducting current causes said relay coil to be energized thereby making and holding a connection between said relay switch common terminal and said relay switch normally open terminal and breaking the connection between said normally closed terminal and said common terminal thereby interrupting the flow of said alarm signal current through said sounding means.

2. A headlight warning circuit for use in a vehicle having a headlight switch and an ignition switch, each of said switches having a battery terminal and a non-battery terminal, said non-battery terminals having no direct, non-load intervening path to the vehicle battery, there being a potential difference from said headlight switch non-battery terminal to said ignition switch non-battery terminal when said headlight switch is closed and said ignition switch is open, said potential difference being capable of providing an alarm signal current, said circuit comprising:
   a. a positive circuit terminal and a negative circuit terminal, said positive circuit terminal being connected to the more electrically positive of said headlight switch non-battery terminal and said ignition switch non-battery terminal when said ignition switch is open and said headlight switch is closed and said negative circuit terminal being connected to the more electrically negative non-battery terminal of said headlight switch and said ignition switch;
   b. a rectifier diode having an anode and a cathode, said cathode being connected to said negative circuit terminal;
   c. an electric sounding means having a positive terminal thereof connected to said positive circuit terminal, said electric sounding means having a negative terminal connectable to said diode anode, said sounding means emitting an audible tone in response to said alarm signal current flow therethrough; and
   d. override means in the circuit and including:
      1. a relay having a coil and a single pole double throw relay switch, said coil having opposite terminals and said relay switch having a normally closed terminal, a normally open terminal, and a common terminal;
      2. said relay coil having one terminal connected to said sounding means positive terminal, the other coil terminal being connected to said relay switch normally open terminal;
      3. said relay switch normally closed terminal being connected to said sounding means negative terminal;
      4. said relay switch common terminal being connected to said diode anode; and
      5. a normally open, momentary contact mute switch connected between said relay switch common terminal and said relay switch normally open terminal, whereby closing said mute switch when said ignition switch is open and said headlight switch is closed causes said relay coil to be energized thereby making and holding a connection between said relay switch common terminal and said relay switch normally open terminal and breaking the connection between said normally closed terminal and said common terminal thereby interrupting the flow of said alarm signal current through said sounding means.

3. A headlight warning circuit for use in a vehicle having an accessory switch and an ignition switch, each of said switches having a battery terminal and a non-battery terminal, said non-battery terminals having no direct, non-load intervening path to the vehicle battery, there being a potential difference from said accessory switch non-battery terminal to said ignition switch non-battery terminal when said accessory switch is closed and said ignition switch is open, said potential difference being capable of providing an alarm signal current, said circuit comprising:
   a. a positive circuit terminal and a negative circuit terminal, said positive circuit terminal being connected to the more electrically positive of said accessory switch non-battery terminal and said ignition switch non-battery terminal when said ignition switch is open and said headlight switch is closed and said negative circuit terminal being connected to the more electrically negative of said accessory switch non-battery terminal and said ignition switch non-battery terminal;
   b. a rectifier diode having an anode and a cathode, said cathode being connected to said negative circuit terminal;
   c. an electric sounding means having a positive terminal thereof connected to said positive circuit terminal, said electric sounding means having a negative terminal connectable to said diode anode, said sounding means emitting an audible tone in response to said alarm signal current flow therethrough; and
   d. override means in the circuit and including:
      1. a relay having a coil and a single pole double throw relay switch, said coil having opposite terminals and said relay switch having a normally closed terminal, a normally open terminal, and a common terminal;
      2. said relay coil having one terminal connected to said sounding means positive terminal, the other coil terminal being connected to said relay switch normally open terminal;
      3. said relay switch normally closed terminal being connected to said sounding means negative terminal;
      4. said relay switch common terminal being connected to said diode anode; and
      5. a normally open, momentary contact mute switch connected between said relay switch common terminal and said relay switch normally open terminal, whereby closing said mute switch when said ignition switch is open and said accessory switch is closed causes said relay coil to be energized thereby making and holding a connection between said relay switch common terminal and said relay switch normally open terminal and breaking the connection between said normally closed terminal and said common terminal thereby interrupting the flow of said alarm signal current through said sounding means.

* * * * *